(12) United States Patent
Roth

(10) Patent No.: US 6,239,667 B1
(45) Date of Patent: May 29, 2001

(54) ATTENUATION EQUALIZER FOR TRANSMISSION LINES

(75) Inventor: Bernhard Roth, Boeblingen (DE)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/526,916

(22) Filed: Mar. 16, 2000

Related U.S. Application Data

(62) Division of application No. 09/210,254, filed on Dec. 11, 1998, now abandoned.

(30) Foreign Application Priority Data

Jan. 15, 1998 (EP) .................................................. 98100597

(51) Int. Cl.$^7$ .................................................. H03G 11/04
(52) U.S. Cl. .............................................. 333/18; 375/230
(58) Field of Search ............................... 333/28 R, 28 T, 333/18; 381/103; 375/230, 229

(56) References Cited

U.S. PATENT DOCUMENTS

| 3,130,374 | 4/1964 | Beres et al. ................. 330/109 X |
| 4,208,640 | 6/1980 | van der Meijs ..................... 333/18 |
| 5,530,769 | 6/1996 | Saitoh ........................ 333/28 T X |

FOREIGN PATENT DOCUMENTS

| 3124328 | 6/1981 | (DE) . |
| 4022468 | 7/1990 | (DE) . |
| 62-7209 | 1/1987 | (JP) ................................. 381/109 |

*Primary Examiner*—Benny Lee
*Assistant Examiner*—Stephen E. Jones

(57) ABSTRACT

Described is an attenuation equalizer for compensating an attenuation characteristic of a transmission line, including a first node and a second node, a first frequency filter unit coupled to the first node and/or to the second node for frequency filtering an applied signal, a first current source coupled to the first node in order to control a current provided by the first current source to the second node.

8 Claims, 9 Drawing Sheets

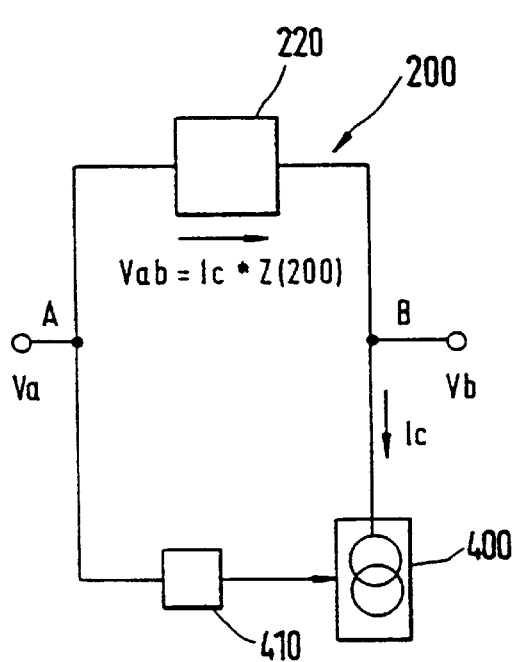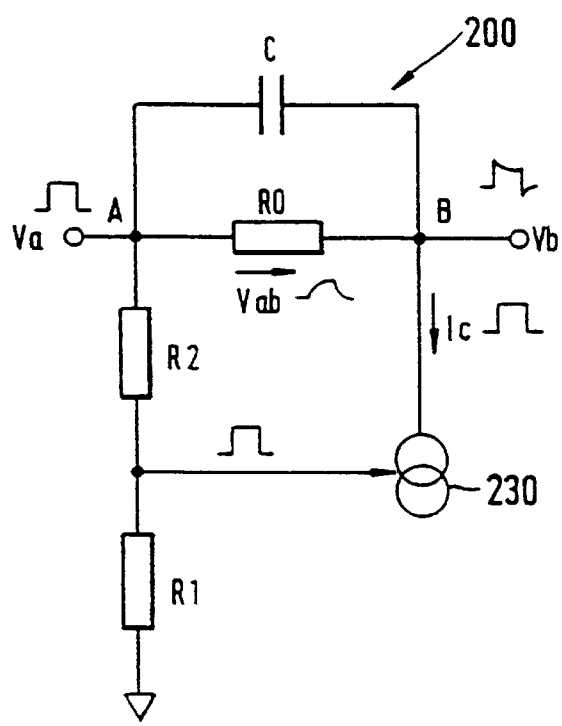
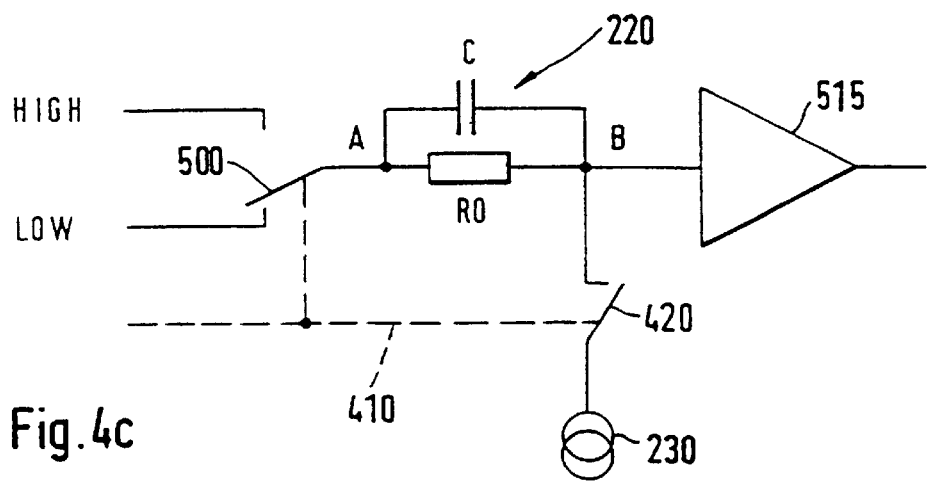

ATTENUATION EQUALIZER FOR TRANSMISSION LINES

This is a division, of application Ser. No. 09/210,254 filed Dec. 11, 1998 (abandoned) which, in turn, claims priority from European Patent Application No. 98100597.8 filed (published as EP0872961 on Oct. 21, 1998).

BACKGROUND OF THE INVENTION

The present invention generally relates to attenuation equalizing of transmission lines.

Transmission lines generally represent conductive connections between system elements carrying signal power. However, due to non-ideal physical properties of any transmission line, the transmission lines more or less attenuate the signals to be transmitted. FIG. 1a shows a schematic example of a transmission line 10 connected between a signal generator 20 at a node 25 and a termination impedance 30 at a node 35. The transmission line 10 shall also comprise a serial impedance 40. Both impedances 30 and 40 are normally designed to match the characteristic impedance of the transmission line 10. The signal generator 20 in FIG. 1a is exemplarily depicted as a pulse generator for generating rectangular pulses, e.g., in a digital system.

FIG. 1b shows the transmission line effect for an example of a typical transmission line 10 with a frequency dependent attenuation in the circuit according to FIG. 1a, whereby the x-axis shows the time in seconds and the y-axis shows the ratio of the input signal at node 25 divided by two times and the output signal at node 35. In this example, the transmission line 10 shall provide an impedance of 50 Ω with a propagation delay of 3.2 ns, and the impedances 40 and 30 shall also be 50 Ω. The rise time (defined as the time interval of a leading edge between the instants at which the instantaneous value first reaches specific lower and upper limits of 10% and 90% of the signal amplitude) of a stimulus signal 50 from the signal generator 20 is assumed to be 0.8 ns. The stimulus signal 50 appears at the impedance 30 as an attenuated signal 60, attenuated by almost 10% and it takes almost 10 ns until the output has achieved its final value.

In case that the signal generator 20 applies pulses at the node 25, and in particular rectangle pulses, the falling edge of a transmitted pulse at node 35 might already 'start' before the rising edge has reached its maximum amplitude, due to the transmission line effect as shown in FIG. 1b. This leads not only to a degradation in shape of the original pulse, but also to a timing error as a change in the propagation delay for the negative slope with varying pulse widths. FIG. 1c shows the influence of the transmission line effect for pulses with decreasing pulse widths, whereby the x-axis shows the time in seconds and the y-axis shows the output signal at node 35. FIG. 1d depicts the dependency of the timing-error on the pulse width, whereby the x-axis shows the pulse width in seconds and the y-axis shows the timing-error in seconds. FIGS. 1c and 1d are both based on the values of the example of FIG. 1b.

It is apparent that an increasing timing-error occurs with a decreased pulse width. In particular in testing applications, e.g. in digital IC testers, with a required timing accuracy of 300 ps or less, an error of 65 ps at 1 ns pulse width (compare FIG. 1d) represents a significant portion. Slower transition times increase the error, whereas faster transition times decrease it.

Attenuation equalizers as corrective networks are commonly used in order to compensate the attenuation characteristics of transmission lines. The attenuation equalizers are generally designed to make an absolute value of a transfer impedance, with respect to two chosen pairs of terminals, substantially constant for a certain frequency range.

FIG. 2a depicts a common concept to avoid transmission line effects, as indicated by the FIG. 1, by providing an attenuation equalizer 100 for amplifying the higher frequencies more than the lower frequencies, or for attenuating the lower frequencies. The attenuation equalizer 100 is coupled between the node 25 and a node 105 before the transmission line 10.

An example of the attenuation equalizer 100 in FIG. 2a, as an R-C network for an ordinary high pass filter well known in the art, is given in FIG. 2b. The attenuation equalizer 100 comprises a parallel connection of a resistor 110 and a capacitor 120, coupled with one connection to the node 25 and with the other connection to a node 130. A second resistor 140 is shunted between the node 130 and ground, and a buffer 150 might be connected in series between the nodes 130 and 105.

FIG. 2c shows the stimulus signal 50 from the signal generator 20 and the corresponding attenuated signal 60 for a resistor-ratio to be chosen as 10.25:1 and a time-constant of 1.8 ns of the RC network in FIG. 2b. The rising edge of the attenuated signal 60 has been improved though the amplitude has been decreased. The thus improved error-curve is depicted in FIG. 2d.

A more detailed investigation still shows some errors since the simple approach cannot compensate the effect totally. More complex circuits including two or more time constants are able to reduce these even more. However, if simple R-C networks are applied as the attenuation equalizer 100, certain drawbacks have to be encountered:

The compensation ratio is fixed.

The required time constant can hardly be achieved in an on-chip application. E.g., a 100 Ω resistor requires a 18 pF capacitor which requires a large amount of silicon space.

The resulting time constant varies with large on-chip resistor tolerances (e.g., ±20%).

Bringing the signal off-chip for compensation and on-chip for further buffering introduces additional capacitances and inductances in a possibly highly sensitive high-frequency signal path.

Other attenuation equalizers are known in the art, such as EP 0 607 702 A2 disclosing an attenuation equalizer designed for long transmission lines (about 100 m) and frequencies in the range of 125 MHz. JP 7007375 discloses a further attenuation equalizer, wherein an element constant is controlled by a filter constant control circuit. Data given to the circuit connects a switch to a pulse waveform generator side, connects another switch to a transmission line side, and connects a further switch to a waveform measuring instrument side.

SUMMARY OF THE INVENTION

It is an object of the invention to provide an improved attenuation equalizer. The object is solved by providing a frequency filtering in combination with a current compensation.

According to the invention, an attenuation equalizer for compensating an attenuation characteristics of a transmission line comprises a first node, a second node, and a first frequency filter unit coupled to the first node and/or to the second node for frequency filtering an applied signal. A first current source is coupled to the first node in order to control a current provided by the first current source to the second node.

The invention allows to greatly reduce timing errors which occur when high frequency digital signals are fed through transmission lines which do not have the highest quality concerning attenuation. This permits to employ, e.g., digital signals well in the GHz range, transmission lines with small dimensions (increasing functionality per space/volume), and/or smaller cables (which are more flexible, giving more degrees of freedom for an optimum mechanical design). The costs for extremely good cables which usually rises exponentially with quality can be kept down, smaller and flexible cables can be used in conjunction with smaller and cheaper interconnections, and/or varying electrical length which occur quite often in a test-setup (on load boards or when probing on the wafer) can be compensated (even automatically). Other high frequency sensitive components (e.g., relays, connectors) also can be selected for small space and low price. The solution according to the invention is also suitable for both signal directions in a bidirectional signal application.

According to a first aspect of the invention, the attenuation equalizer comprises a signal path with the first node and the second node. A correction path for correcting the frequency behavior of the signal applied to the first node comprises the first frequency filter unit coupled to the first node for controlling the first current source. This allows that the high frequency path itself is not directly affected by the frequency filtering.

According to a second aspect of the invention, the first frequency filter unit is coupled between the first node and to the second node for frequency filtering an applied signal. The first current source is coupled to the first node in order to control a current provided by the first current source to the second node.

According to a third aspect of the invention, the attenuation equalizer comprises a third node, a second frequency filter unit, a second current source, and a switching unit. The first frequency filter unit is coupled to one of the first node or to the second node. The second frequency filter unit is coupled to the first node in case that the first frequency filter unit is also coupled to the first node. In case that the first frequency filter unit is coupled to the second node, the second frequency filter unit is coupled to the third node. The switching unit is adapted to switch between the potential at the second node and the third node and provides an output thereof at the first node. The first current source is coupled to the first node in order to control a current provided to the second node, and the second current source is coupled to the first node in order to control a current provided to the third node. This allows that the high frequency path itself is not directly affected by the frequency filtering.

The frequency filter unit(s) of the attenuation equalizer according to invention preferably exhibit(s) a low pass characteristics, because the components determining the filter characteristics do not affect the high frequency path.

Further more, the frequency filter unit(s) of the attenuation equalizer according to invention is/are preferably embodied as off-chip component(s). In case of a simple n-components RC network as the frequency filter, only n passive components determine the compensation effect which can easily be established and changed without touching silicon. Such discrete components often can be built with much lower tolerances, thus keeping the variation of the filter characteristics small.

The magnitude of the current provided by the current source(s) is preferably controllable by a control electrode of the current source. This allows a direct coupling of the current source(s) to the potential at the first node, and thus to the signal to be modified for compensating the transmission line effects. The magnitude can also or further be controlled by a switching unit for switching the current provided by the current source(s) either on or off.

In a preferred embodiment the current source(s) is a programmable current source, so that the ratio between the potential at the control electrode and the magnitude of the current provided by the current source(s) is a programmable value, which can be controlled by the potential at the first node. The current source(s) might comprise a current switching means and at least one current path coupled to the current switching means. The at least one current path(s) is/are selectable by respective switching means in order to select the magnitude of the current.

The attenuation equalizer according to the invention is preferably used for compensating an attenuation characteristics of a transmission line in a tester equipment for testing electronic devices, such as digital integrated circuits (ICs).

It is to be understood that the compensation provided by the current source(s) has an impact on the DC behavior of the entire circuit, so that a DC calibration might have to be performed after a setting of the compensation by the current source. In case of a driver, the required DC level range at the input has to be higher than the level range at the output.

BRIEF DESCRIPTION OF THE DRAWINGS

Other objects and many of the attendant advantages of the present invention will be readily appreciated and become better understood by reference to the following detailed description when considering in connection with the accompanied drawings, in which:

FIGS. 4a–c show embodiments of an attenuation equalizer 200 according to a second aspect of the invention.

DETAILED DESCRIPTION OF THE INVENTION

Figure 1A:
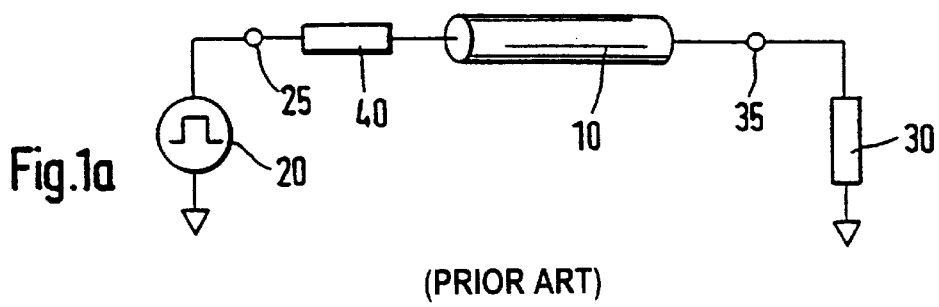
FIG. 1a shows a schematic example of a transmission line connected between a signal generator and a termination impedance, as known in the art.
Figure 1B:
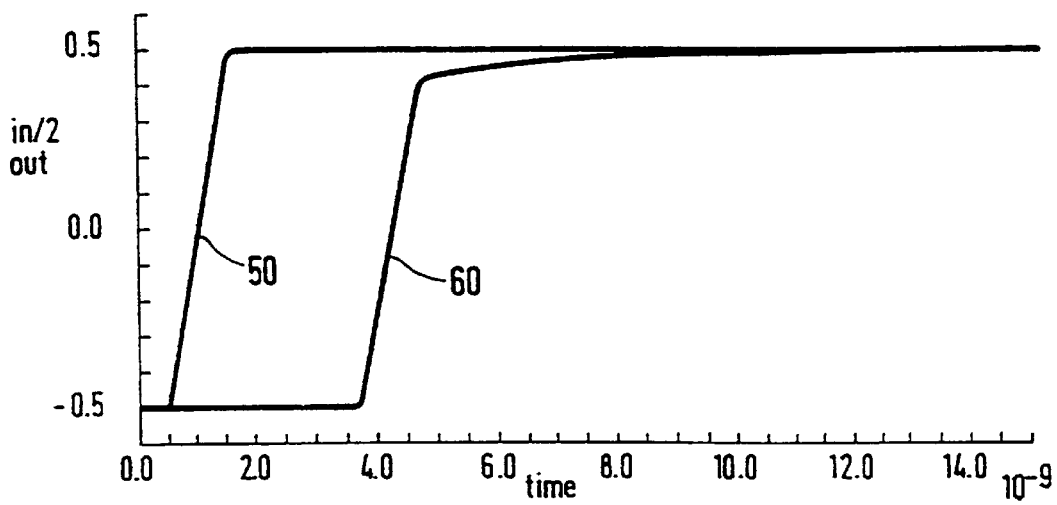
FIG. 1b shows the transmission line effect for an example of a typical transmission line 10 in FIG. 1a, FIG. 1c shows the influence of the transmission line effect for pulses with decreasing pulse widths.
Figure 1C:
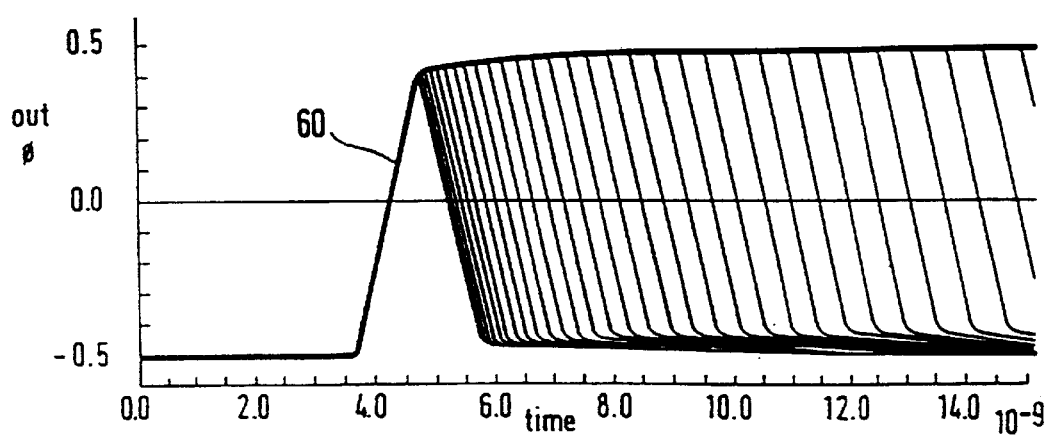
FIG. 1d depicts the dependency of the timing-error on the pulse width, FIGS. 2a,b depict common concepts to avoid transmission line effects as known in the art, FIGS. 2c,d show the pulse response and error-curve in the circuit of FIG. 2b, FIGS. 3a–d show embodiments of an attenuation equalizer 200 according to a first aspect of the invention.
Figure 1D:
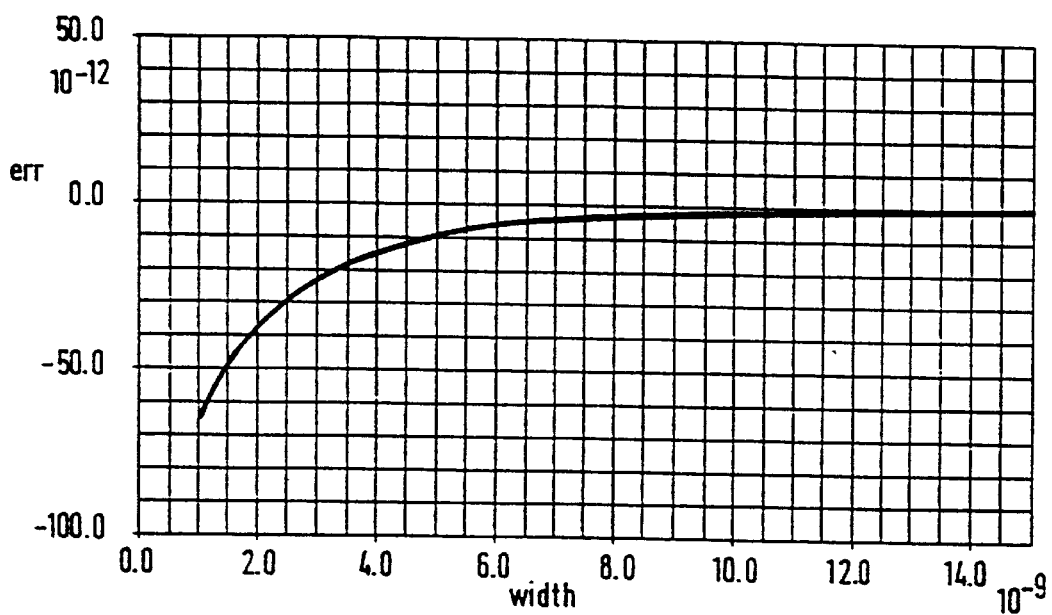
Figure 2A:
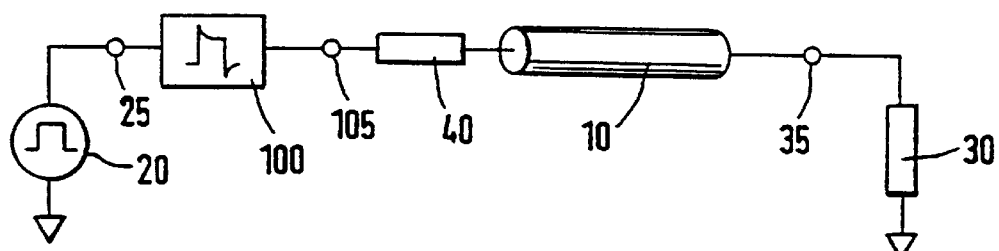
Figure 2B:
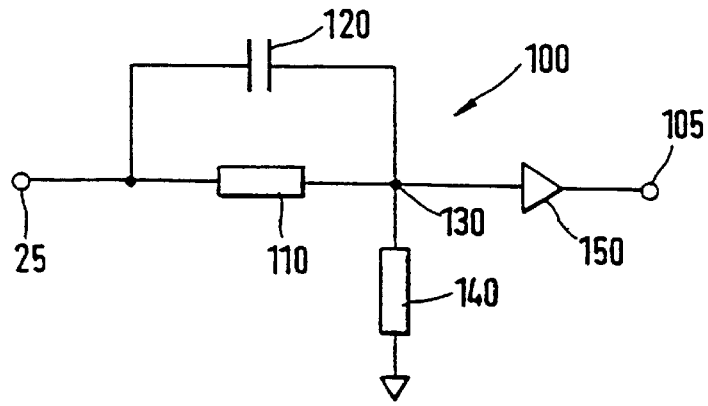
Figure 2C:
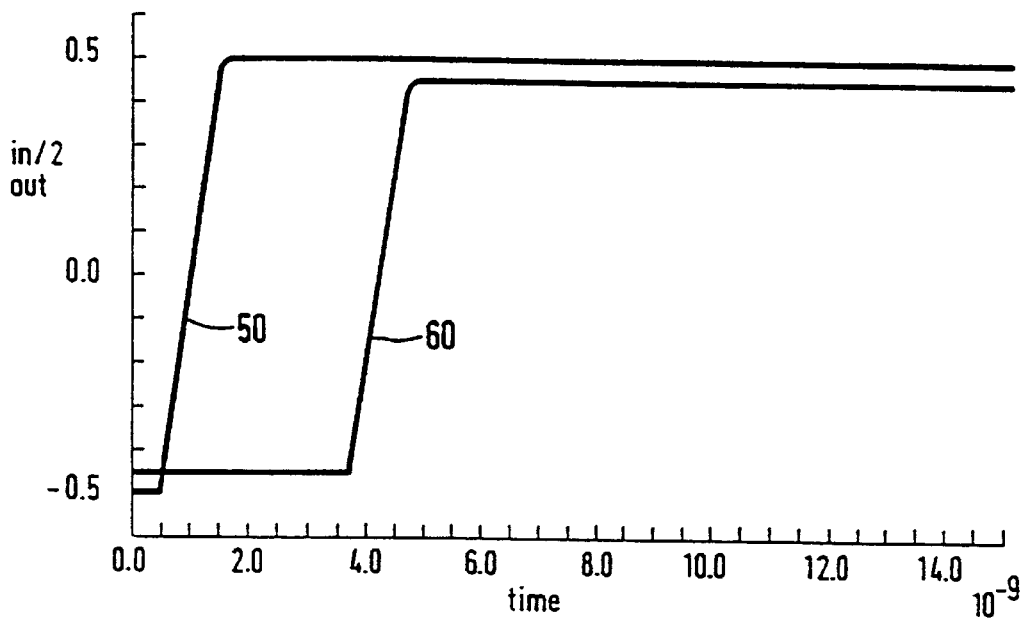
Figure 2D:
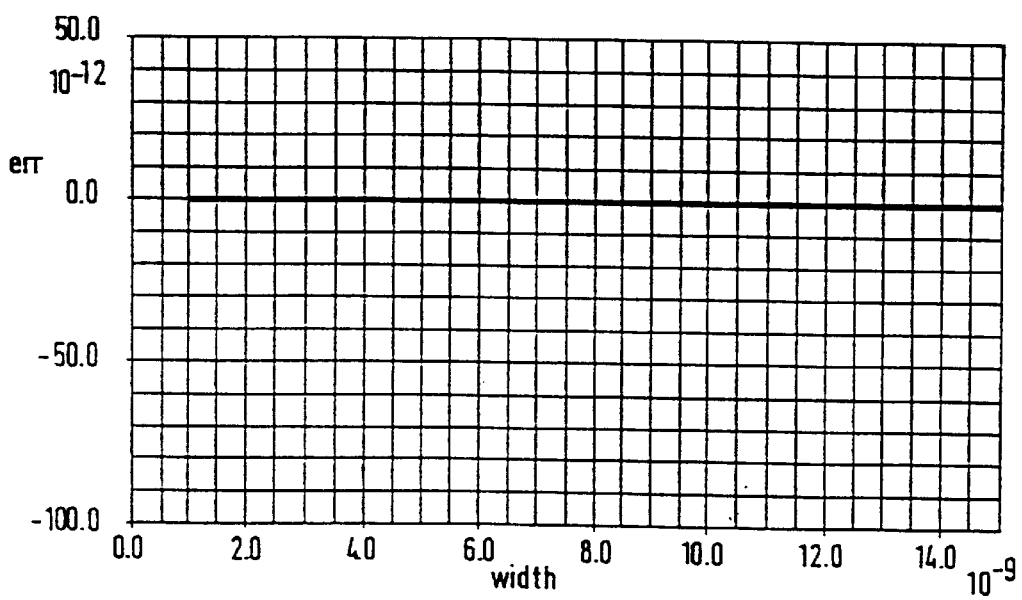
Figure 3A:
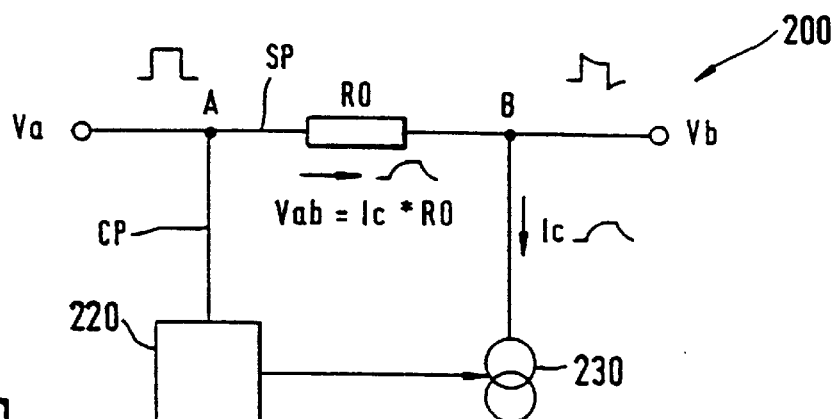
FIG. 3e shows the influence of the time-constant on the timing errors.
FIG. 3f shows the behavior of the timing errors when the electrical length of the transmission line is increased.

FIG. 3a shows a schematic representation of an attenuation equalizer 200 according to a first aspect of the invention. The attenuation equalizer 200 can be used, e.g., as the attenuation equalizer 100 in the circuit as shown in FIG. 2a. The attenuation equalizer 200 comprises a signal path SP with an impedance R0 and, in parallel thereto, a correction path CP for correcting the frequency behavior of the signals on the signal path SP. The correction path CP comprises a frequency filter unit 220, coupled to a node A in the signal path SP, for controlling a current source 230 which again couples to a node B in the signal path SP.

The frequency filter unit 220 can be any kind of filter as known in the art such as a low or high pass filter. For high frequency (HF) applications, the frequency filter unit 220 preferably is a low pass filter, so that the correction path CP represents a low frequency correction path and the signal path SP represents a high frequency path.

In operation, a signal Va at the node A is applied to the frequency filter unit 220, which controls the current source 230 according to the frequency filtering by the frequency filter unit 220. At node B, the current source 230 couples a frequency modified current Ic which leads to a voltage Vab (between nodes A and B in the signal path SP) across the impedance R0 with Vab=Ic*R0, resulting in an output signal Vb at node B with Vb=Va−Vab=Va−(Ic*R0).

In case that the frequency filter unit 220 is a low pass filter, the signal on the signal path SP is low pass filtered by the frequency filter unit 220 and the current source 230 is controlled therewith. The frequency modified current Ic in that case is a positive current which leads to a voltage Vab across the impedance R0 with Vab=Ic*R0, which in turn is subtracted from the voltage signal Va at node A, resulting in the output signal Vb at node B. An example for the currents and voltages in that case is indicated in FIG. 3a for a rectangular signal as Va.

Figure 3B:
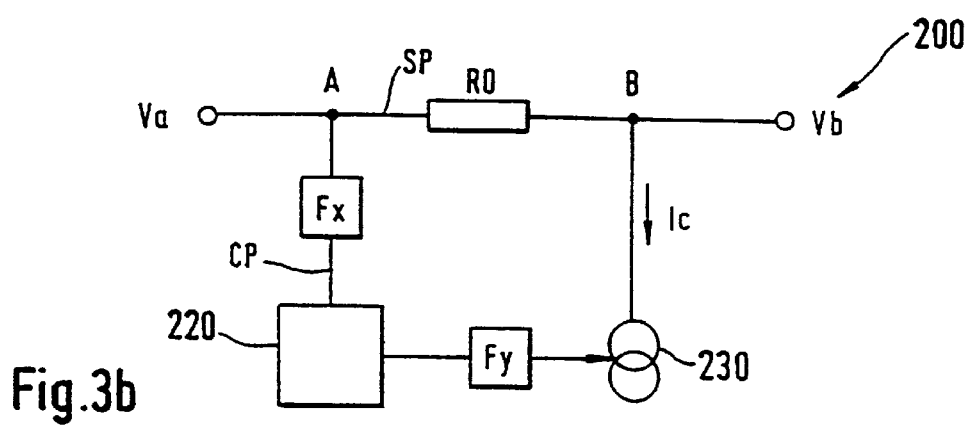

The controlling of the current source 230 by the frequency filter unit 220 is depicted FIG. 3b by introducing a factor Fx between the node A and the frequency filter unit 220 and/or a factor Fy between the frequency filter unit 220 and the current source 230. Factor Fx may represent the ratio of the signal at the node A applied to the frequency filter unit 220, e.g., by a voltage divider. Factor Fy may represent a transfer ratio of a voltage controller for the current source 230, a programmable current source, or any other means for controlling the current source 230.

Figure 3C:
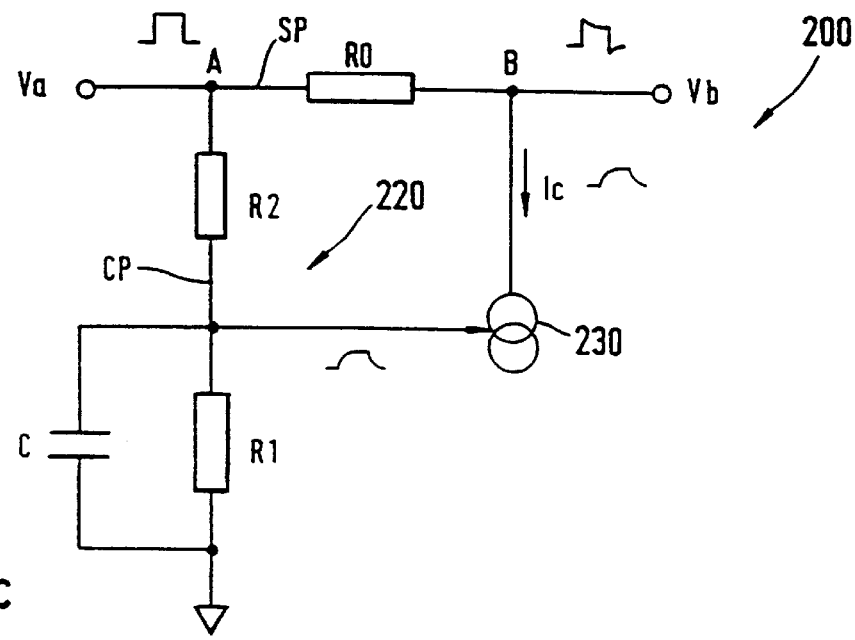

FIG. 3c shows an example of the attenuation equalizer 200 comprising a low pass filter as the frequency filter unit 220. A capacitance C together with impedances R1 and R2 represent the low pass filter of the frequency filter unit 220 with a time constant T=(R1∥R2)*C=R1*R2/(R1+R2) *C≈R1*C (if R2>>R1). The impedance R2 together with the impedance R1 represent, as factor Fx, a voltage divider dividing the voltage at the node A by a ratio r=R1/(R1+R2) to the low pass filter (R1∥R2 and C). The low pass filter again provides the signal from node A low pass filtered to a control electrode of the current source 230, as indicated in FIG. 3c for a rectangular signal as Va.

Figure 3D:
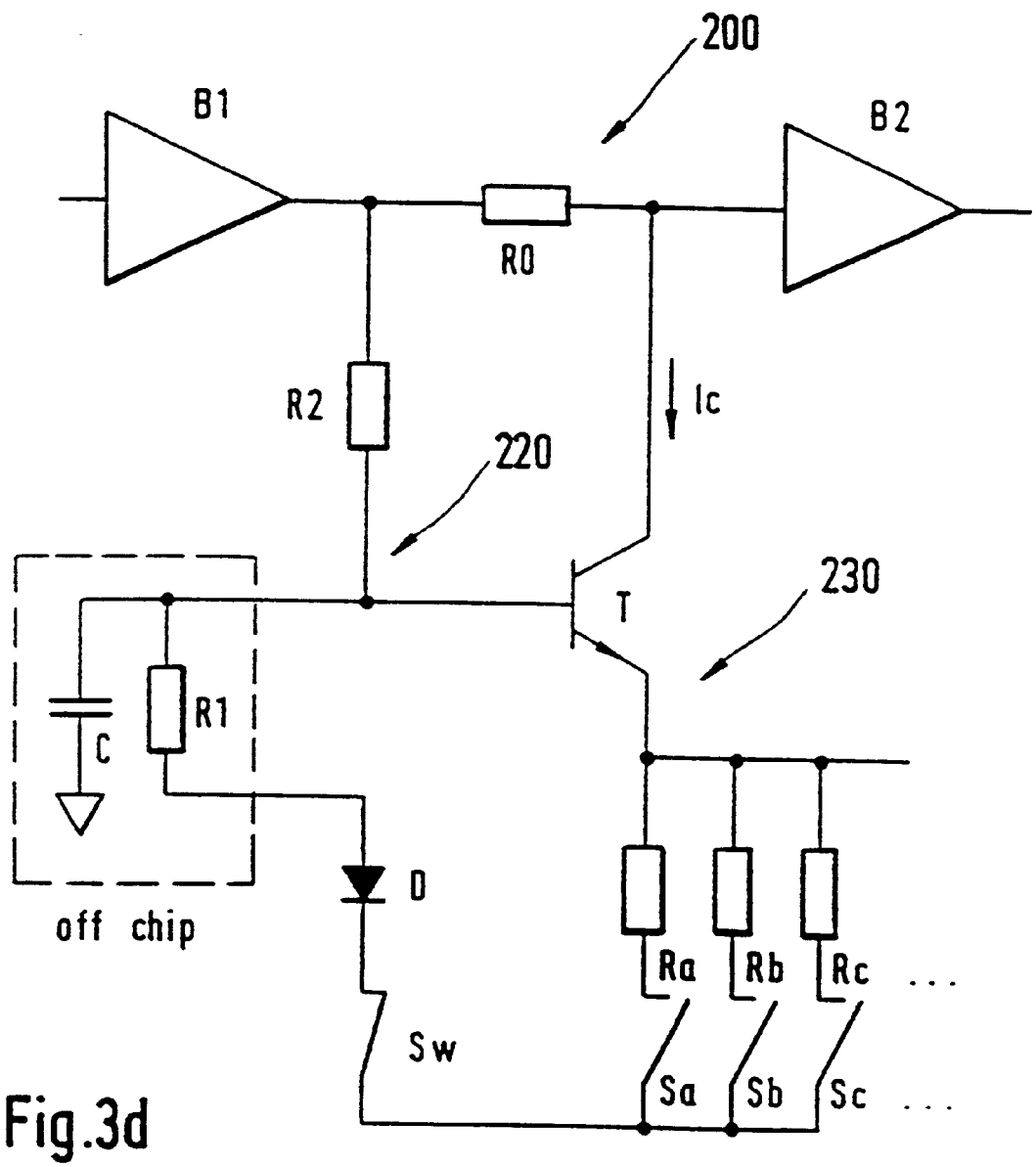

FIG. 3d shows an example of a programmable attenuation equalizer 200 based on the embodiment of the attenuation equalizer 200 of FIG. 3c. The current source 230 is embodied by a transistor T coupled to a plurality of impedances Ra, Rb, Rc, . . . , which can be respectively selected, e.g., by respective switching means Sa, Sb, Sc , . . . , in order to set the value for the transfer ratio (i.e. Ic/V at the base of the transistor T). In an example, the values for the impedances are selected as: R0=2R, R1=R, R2=19R, Ra=R, Rb=2R, Rc=4R, and so on.

The attenuation equalizer 200 may be connected between buffers B1 and B2, whereby the first buffer B1 must be able to handle the load (in the example: 20R). The collector of the transistor T represents only a small capacitive load to the signal. The impedance R1 and the capacitor C are preferably embodied as off chip components, in contrast to the other components which represent on chip components, so that the time constant T=(R1∥R2)*C is mainly defined by the two external components, leading to a tight tolerance control. The resolution of the compensation by the attenuation equalizer 200 depends on the number of impedances Ra, Rb, Rc, . . . , switchable to the transistor T. The magnitude of the compensation depends on the tolerance of the on-chip resistor (here: 19R), but can be adjusted by the switching means Sa, Sb, Sc , . . . A diode D and a (closed) switching means Sw may be used for symmetry purposes. The switching means can be implemented in various ways as known in the art (e.g., saturated transistors).

Figure 3E:
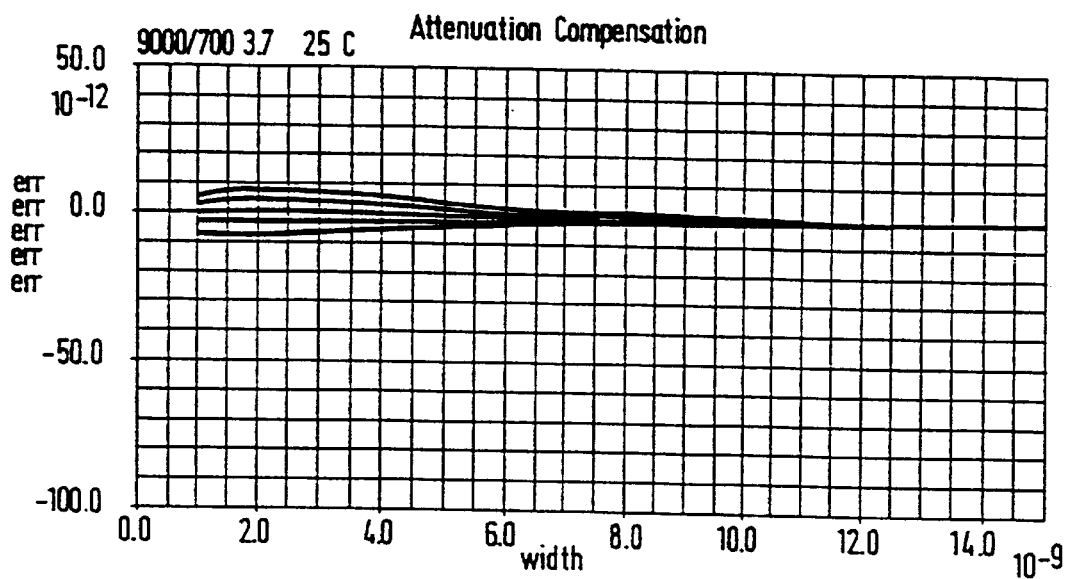

FIG. 3e shows the timing errors when the time-constant in FIG. 3d is changed from −20% (the upper most curve) to +20% (the lowest curve) in 10% steps. This shows that standard components (e.g. a capacitor with a tolerance of 10% and a resistor with a tolerance of 1% ) will provide a good compensation with small variations.

Figure 3F:
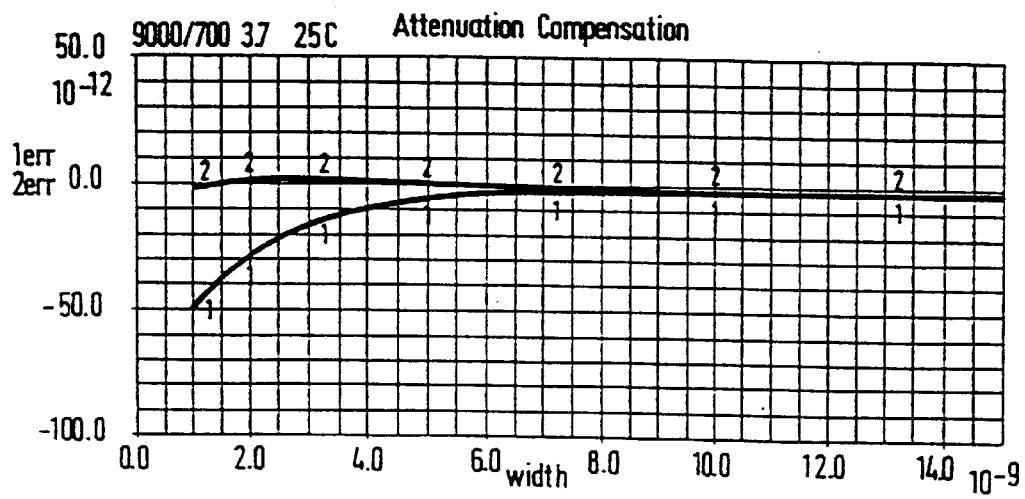

FIG. 3f shows the behavior of the timing errors when the electrical length of the transmission line 10 is increased. In the example of FIG. 3f, the electrical length of the transmission line is increased from 3.2 ns by 75% to 5.6 ns, whereby the time constant of the frequency filter 220 is kept at 1.8 ns. Curve 1 shows the timing error when the magnitude of the current provided by the current source 230 is kept at the same value. Curve 2—in contrast thereto—shows the timing error when the magnitude of the current is increased by 65%. It is apparent, that the effects of varying electrical lengths of the transmission line 10 can almost be compensated by adjusting the magnitude of current compensation provided by the current source 230, while leaving the time constant as it is, once it has been determined.

An adjustment of the magnitude of the current compensation provided by the current source 230 is preferably accomplished in that the current source 230 is embodied as a controllable or programmable current source, whereby the current provided by the current source 230 can be determined by a direct coupling of the potential from the node A and/or by setting the magnitude of the provided current (e.g. by means of the transfer ratio) to a certain value (as depicted in FIG. 3d wherein the current source 230 is programmable by means of the switches Sa, Sb, Sc, . . . ).

FIG. 4a shows a schematic representation of an attenuation equalizer 200 according to a second aspect of the invention. The frequency filter unit 220 is coupled between node A and node B. A current source unit 400 couples to node B and is controlled from the node A by a control element 410, so that the current coupled to node B represents the signal at node A.

In operation, the signal Va at node A is applied to the frequency filter unit 220, and via the control element 410 to the current source unit 400. The current source unit 400 provides the current Ic to node B, which leads to a voltage Vab across the frequency filter unit 220 according to its complex impedance Z(220) with Vab=Ic*Z(220), thus resulting in the output voltage Vb at node B with Vb=Va−Vab.

FIG. 4b depicts a first example for an embodiment of the attenuation equalizer 200 of FIG. 4a. The capacitance C together with the impedance R0 represent a low pass filter of the frequency filter unit 220 with a time constant T=R0*C. The impedance R2 together with the impedance R1 represent, as the control element 410, a voltage divider dividing the voltage Va at node A by a ratio r=R1(R1+R2) to the current source unit 400, which is embodied in FIG. 4a by the current source 230. The control element 410 is connected to a control electrode of the current source 230, thus providing a direct coupling of the signal at node A to the current source 230. An example of the currents and voltages for an rectangular voltage Va is indicated in FIG. 4b.

FIG. 4c depicts a second example of an embodiment of the attenuation equalizer 200 of FIG. 4a. In accordance with FIG. 4b, the capacitance C together with the impedance R0 represent a filter of the frequency filter unit 220 with a time constant T=R0*C. The current source unit 400 in FIG. 4c is embodied by the current source 230 in series with a switching unit 420. The control element 410 provides an indirect connection between the signal at node A and the switching unit 420. The current source 230 provides a current to node B which is proportional to the potential difference at node A.

In the example of FIG. 4c, the node A is directly coupled to a High/Low switch 500 for generating digital pulses by switching between a source of high potential HIGH and a source of low potential LOW. The current source 230 is thus switched simultaneously with the High/Low switch 500. After switching from HIGH to LOW, or vice versa, the current source 230 changes the DC-level. The current source 230 is adapted to provide a current proportional to the voltage difference between the HIGH and the LOW signal. This can be accomplished e.g. by means of programmable digital analog converters (DACs) which, in this way, can also control the amount of the compensation provided from the current source 230. The attenuation equalizer 200 might be decoupled by a buffer 515.

FIGS. 5a to 5d show embodiments according to a third aspect of the invention, wherein the attenuation equalizer 200 'encloses' the High/Low switch 500 between the nodes A, B, and a further node 540. The High/Low switch 500 switches between the nodes B and 540 and provides an output thereof at node A.

Figure 5A:
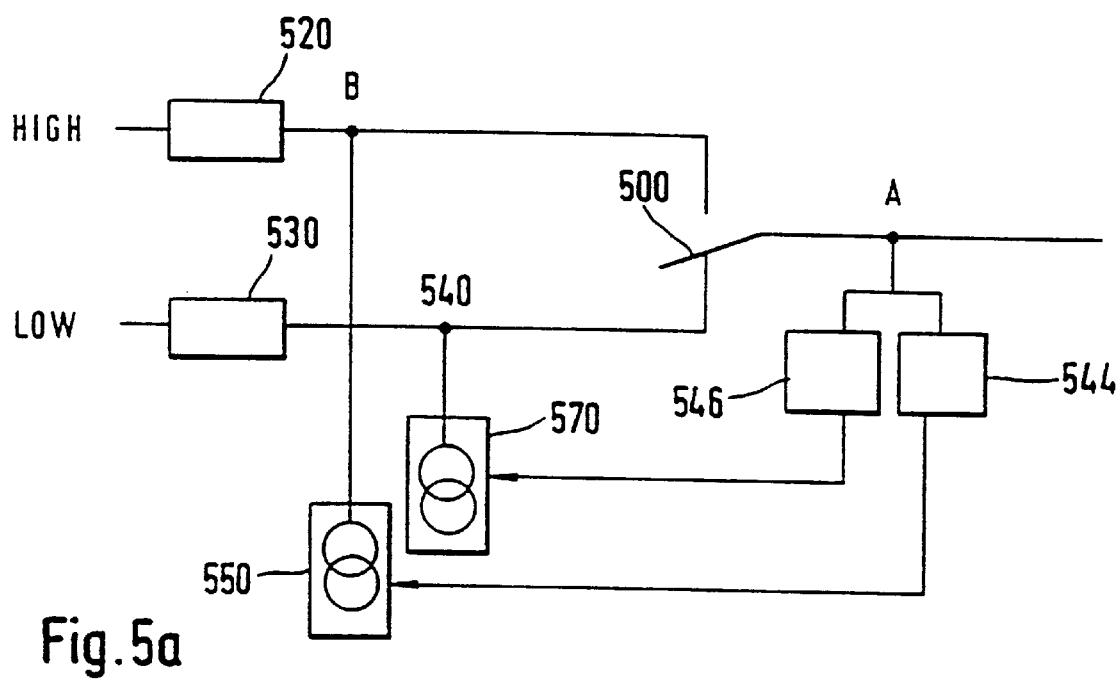
FIGS. 5a–d show embodiments according to a third aspect of the invention.

In FIG. 5a, a first frequency filter 520 is coupled to the source of high potential HIGH and the node B, and a second frequency filter 530 is coupled to the source of low potential LOW and the node 540. The signal at node A is 'coupled back' via a first control element 544 to a first current source unit 550 coupling to the node B for providing a current thereto, and via a second control element 546 to a second current source unit 570 coupling to the node 540 for providing a current thereto. The current provided from the current source unit 550 to the node B creates a voltage across the first frequency filter 520 which is subtracted from the HIGH potential. Accordingly, the current provided from the current source unit 570 to the node 540 creates a voltage across the second frequency filter 530 which is subtracted from the LOW potential.

Figure 5B:
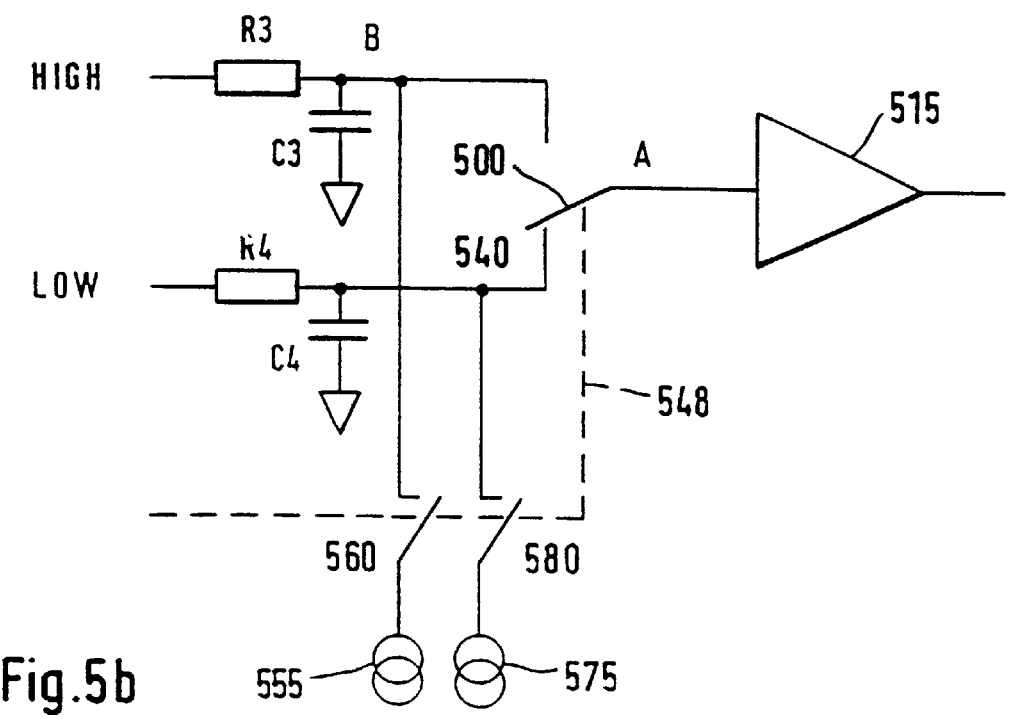

FIG. 5b shows an embodiment of FIG. 5a. The first frequency filter 520, which is connected between the HIGH potential and the node B, is embodied by a low pass filter provided by an impedance R3 shunted to ground via a capacitor C3. Accordingly, the second frequency filter 530, which is connected between the LOW potential and the node 540, is embodied by a low pass filter provided by an impedance R4 shunted to ground via a capacitor C4. The first control element 544 and the second control element 546 respectively provide a signal derived from node A to the first current source unit 550 or to the second current source unit 570. The current source unit 550 comprises a current source 555 in series with a switching unit 560 for either switching the current on or off, whereby the switching unit 560 is controlled by the first control element 544. Accordingly, the current source unit 570 comprises a current source 575 in series with a switching unit 580 for either switching the current on or off, whereby the switching unit 580 is controlled by the second control element 546. The current sources 550 and 570 are thus (indirectly) controlled by the signal at the High/Low switch 500 via the switching units 560 and 580. The current sources 555 and 575 are controlled by the voltage difference between the potentials HIGH and LOW. This can be accomplished e.g. by means of programmable digital analog converters (DACs). In FIG. 5b, the indirect controlling of the switching units 560 and 580 via the control elements 544 and 546 is indicated by a dotted line 548, whereby the switching units 560 and 580 are switched simultaneously by the High/Low switch 500.

Figure 5C:
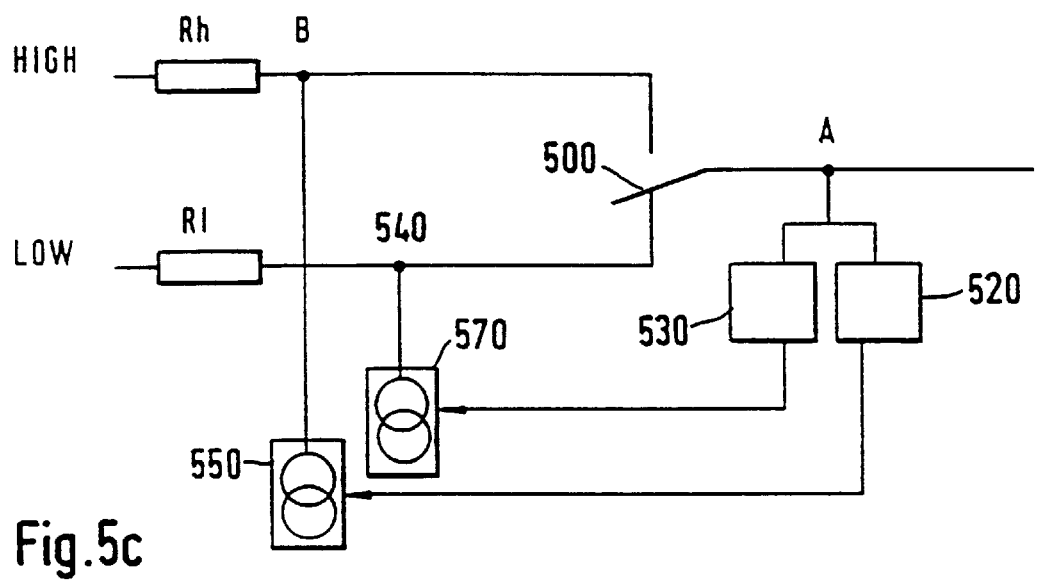

FIG. 5c shows another embodiment of an attenuation equalizer 200 which is preferably applicable for (fast) GaAs FET drivers. The first current source unit 550 couples to node B which again is coupled to the High potential e.g. via an impedance Rh. The second current source 570 couples to node 540 which again is coupled to the Low potential e.g. via an impedance Rl. The High/Low switch 500 substantially switches between the nodes B (HIGH) and 540 (LOW) and provides an output at node A. The current source units 550 and 570 are respectively controlled by the frequency filters 520 and 530 coupling to the output of the High/Low switch 500 at node A.

Figure 5D:
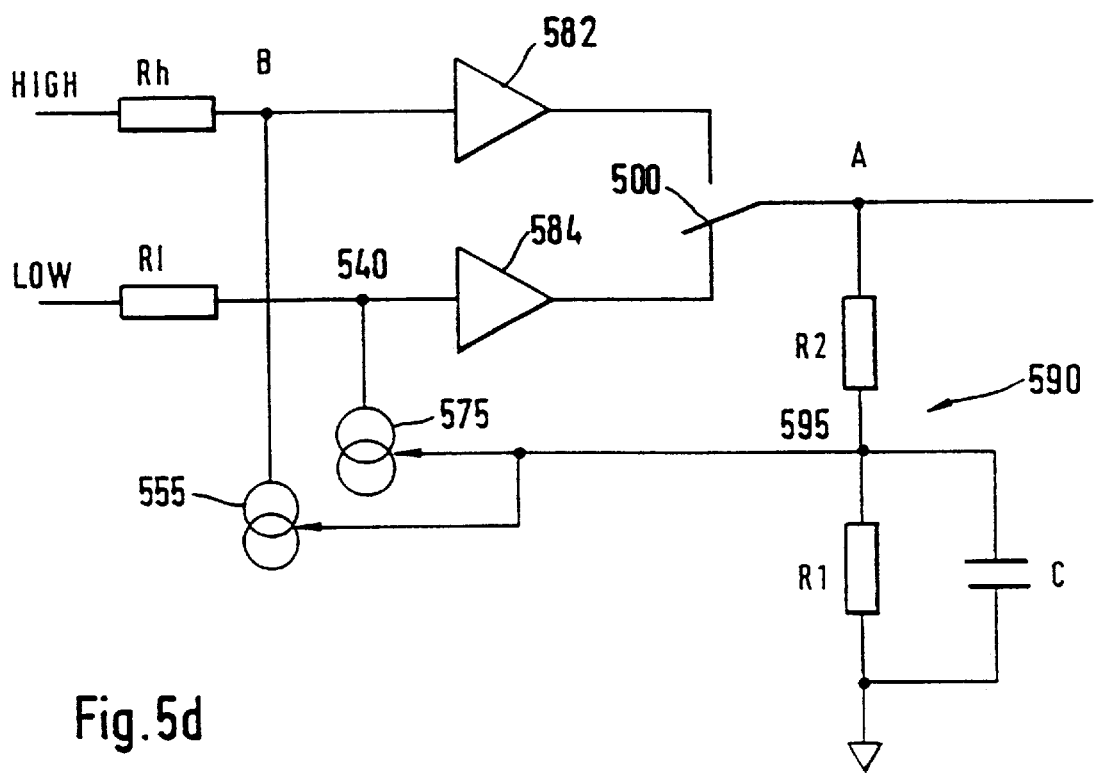

FIG. 5d shows an example of the attenuation equalizer 200 of FIG. 5c. The current source units 550 and 570 are respectively embodied by the currents sources 555 and 575. The frequency filters 520 and 530 are embodied as one frequency filter 590 which couples to the node A and provides a contact to a control electrode of each one of the current sources 555 and 575, respectively. The frequency filter 590 is preferably embodied by a voltage divider consisting of impedances R2 and R1 with a capacitance C in parallel to the impedance R1. A node 595 between the impedances R2 and R1 represents the control potential for the current sources 555 and 575. Buffers 582 and 584 might be coupled between the nodes B or 540 and the High/Low switch 500, respectively.

It is to be understood that the control elements 410, 544, and 546 represent various connections which can be either direct or indirect connections. Direct connections symbolize direct physical connections between the respective potentials, whereas indirect connections represent connections (e.g. software programmed or via control lines) with signals proportional to the potentials coupled to. Furthermore, the control elements 410, 544, and 546 may represent one or individual components as known in the art.

It is further to be understood that the control elements 410, 544, and 546 represent the adjustment of the magnitude of the current compensation provided by the current sources 230, 550, or 570. The current adjustment can be accomplished in that the current sources 230, 550, or 570 are embodied as controllable -or programmable current sources, whereby the amount of current provided is determined by the control elements 410, 544, and 546, respectively. The potential at the node to which the current source is coupled to determines the value of the current provided.

What is claimed is:

1. An attenuation equalizer, for compensating attenuation characteristics of a transmission line, comprising:

a first node and a second node, a first frequency filter unit coupled to the first node and/or to the second node for frequency filtering an applied signal, a first current source coupled to the first node in order to control a current provided by the first current source to the second node, a third node, a second frequency filter unit, a second current source, and a switching unit;

wherein:

the second frequency filter unit is coupled (1) to the first node when the first frequency filter unit is also coupled to the first node, or (2) to the third node when the first frequency filter unit is coupled to the second node, the switching unit is adapted to switch between the potential at the second node and the third node and provides an output thereof at the first node, the first current source is coupled to the first node in order to control a current provided to the second node, and the second current source is coupled to the first node in order to control a current provided to the third node.

2. The attenuation equalizer of claim 1, wherein:

a signal path comprises the first node and the second node, and a correction path, for correcting the frequency behavior of the signal applied to the first node, comprises the first frequency filter unit coupled to the first node for controlling the first current source.

3. The attenuation equalizer of claim 2, wherein the signal path comprises a first impedance, the first frequency filter unit comprises a second impedance, said second impedance coupled with a first electrode to the first node and also coupled with a second electrode to a parallel connection of a capacitor and a third impedance, and the first current source is coupled to the second electrode of the second impedance.

4. The attenuation equalizer according to claim 1, wherein the frequency filter units have a low pass characteristics.

5. The attenuation equalizer according to claim 1, wherein the frequency filter units are embodied as off-chip component(s).

6. The attenuation equalizer according to claim 1, wherein the magnitude of the current provided by the current sources is controllable by a control electrode of the current source and/or by a switching unit for switching the current provided by the current source(s) either on or off.

7. The attenuation equalizer according to claim 1, wherein the current sources comprise a current generating means and at least one current path coupled to the current generating means and being selectable by respective switching means.

8. An attenuation equalizer according to claim 1 for compensating an attenuation characteristic of a transmission line in tester equipment for testing digital integrated circuits.

* * * * *